United States Patent Office.

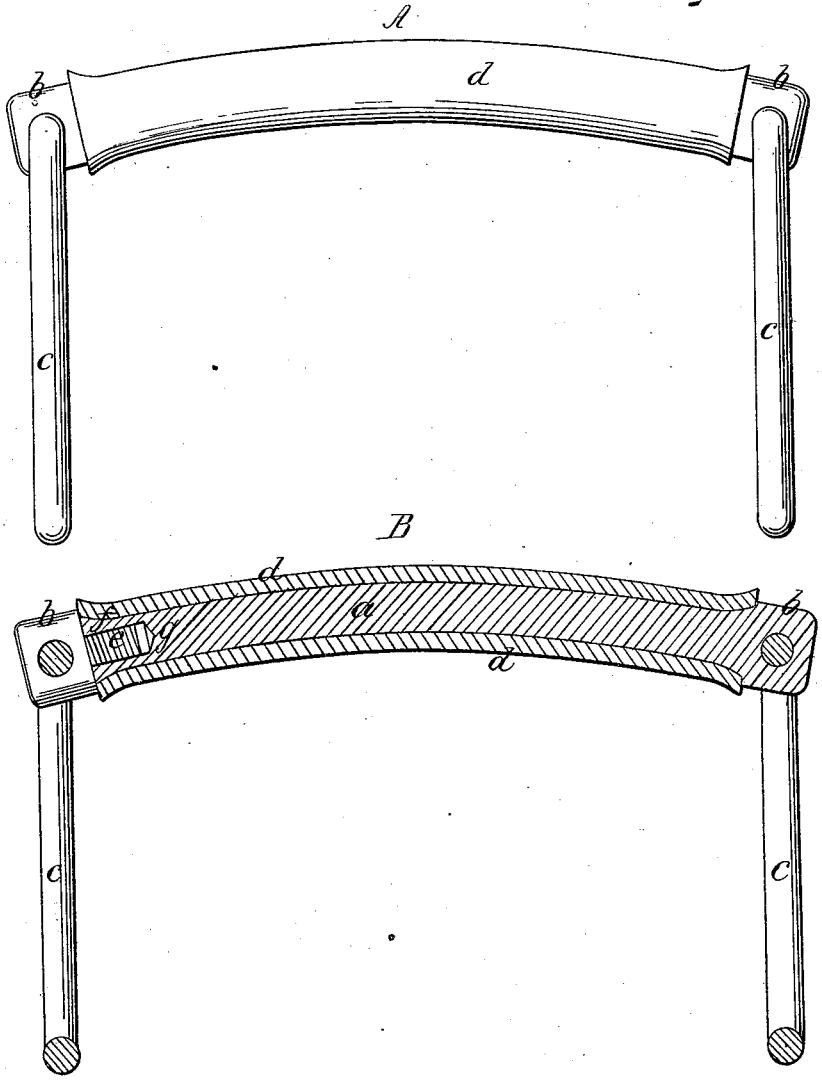

DAVID HALE, OF BOSTON, MASSACHUSETTS.

Letters Patent No. 68,623, dated September 10, 1867.

---

IMPROVED DRIVING-BIT.

---

The Schedule referred to in these Letters Patent and making part of the same.

---

TO ALL WHOM IT MAY CONCERN:

Be it known that I, DAVID HALE, of Boston, in the county of Suffolk, and State of Massachusetts have invented an Improved Driving-Bit; and I do hereby declare that the following, taken in connection with the drawings, which accompany and form part of this specification, is a description of my invention sufficient to enable those skilled in the art to practise it.

In the construction of that class of driving-bits for horses in which the bit is covered with leather or rubber the common practice is (where leather is used) to draw the strip of leather around the bit and stitch the opposite edges together, or (when rubber is used) to cement the rubber to the surface of the bit and its opposite edges together upon the bit. Either of these constructions is objectionable, and my invention has reference to a method of making the bit by which the tubular covering may be formed and finished before application to the bit, and may be readily placed upon or removed from the bit whenever desirable. The invention consists of a bit, having a bar or rod covered with a removable tube of rubber or rubber compound, and a removable screw-head, which, while serving in connection with the opposite head to keep the tubular covering upon the bit, permits the application or removal of the said covering to be effected, whenever desirable, by simply disconnecting this head from the bit-rod.

The drawings represent a bit embodying my improvement, A showing the same in side view, and B a central section thereof.

$a$ denotes the bit-rod or bit proper; $b\ b$, the heads thereof; $c\ c$, the rings; $d$, the tubular cover. One head, $b$, is shown as made with a screw-shank, $e$, to enter a tubular screw-thread formed in the end $f$ of the bit-rod, as seen at $g$. The cover $d$, whether made of leather, rubber, or rubber compound, being first formed into tubular shape and closed up or finished, the end $g$ of the bit-rod is thrust through the same, after effecting which the screw-cap $h$ is applied to the bit-rod, as shown at B, the two caps then serving to securely retain the covering in place upon the rod, as will be readily understood. By this means common rubber tubing of proper size may be used to cover the bit, and an old covering may be removed and replaced with a new one by any person of ordinary skill, whenever desirable, without the necessity of taking the bit to a harness-maker, or of removing it from the bridle. The cost of the bit is not increased by this construction, because the expense of stitching or cementing the leather or rubber over the bit-rod is avoided. This arrangement also permits of the ready application of rings or washers between each head and the adjacent end of the cover. Each head may be thus made removable, but this is not necessary for the purpose of my invention.

I claim a driving-bit having a bar covered with a removable tube of rubber or rubber compound, the bar being provided with a screw-cap which permits application or removal of the tube, substantially as set forth.

DAVID HALE.

Witnesses:
J. B. CROSBY,
FRANCIS GOULD.